United States Patent
Balke

(10) Patent No.: US 9,144,939 B2
(45) Date of Patent: Sep. 29, 2015

(54) FOOD PACKAGING

(75) Inventor: Marcellinus Sijbrandus Lucas Balke, Hoofddorp (NL)

(73) Assignees: Van Steen-Dekker Beheer, BV, Huizan (NL); Monique Balke-Schoonderwoert, Hoofddorp (NL)

( * ) Notice: Subject to any disclaimer, the term of this patent is extended or adjusted under 35 U.S.C. 154(b) by 0 days.

(21) Appl. No.: 14/129,868

(22) PCT Filed: Jun. 29, 2012

(86) PCT No.: PCT/NL2012/050457
§ 371 (c)(1),
(2), (4) Date: Dec. 27, 2013

(87) PCT Pub. No.: WO2013/002639
PCT Pub. Date: Jan. 3, 2013

(65) Prior Publication Data
US 2014/0131428 A1 May 15, 2014

(30) Foreign Application Priority Data

Jun. 29, 2011 (NL) .................................... 2007024

(51) Int. Cl.
*B65D 5/56* (2006.01)
*B65D 25/14* (2006.01)
*B29C 65/76* (2006.01)
(Continued)

(52) U.S. Cl.
CPC ............. *B29C 65/76* (2013.01); *B29C 65/5057* (2013.01); *B29C 65/5071* (2013.01); *B29C 66/112* (2013.01); *B29C 66/131* (2013.01); *B29C 66/53461* (2013.01); *B29C 66/72328* (2013.01); *B29C 66/7486* (2013.01); *B29C 66/849* (2013.01); *B29C 66/851* (2013.01); *B65B 7/164* (2013.01); *B65D 5/56* (2013.01); *B65D 5/563* (2013.01); *B65D 15/22* (2013.01); *B65D 25/14* (2013.01); *B65D 77/20* (2013.01); *B29C 65/5092* (2013.01); *B29C 66/71* (2013.01);
(Continued)

(58) Field of Classification Search
CPC .......... B65D 5/563; B65D 5/60; B65D 5/603; B65D 25/14; B65D 77/2024
See application file for complete search history.

(56) References Cited

U.S. PATENT DOCUMENTS 3,785,544 A * 1/1974 Smith ........................... 206/446
4,257,530 A * 3/1981 Faller ....................... 229/125.35
(Continued)

FOREIGN PATENT DOCUMENTS

| AU | 2009233639 | 5/2011 | |
|---|---|---|---|
| EP | 2025605 | 2/2009 | |
| WO | WO 2004033324 | 4/2004 | |
| WO | WO 2009074721 | 6/2009 | |
| WO | WO-2009/138786 A2 * | 11/2009 | ............... B65D 5/56 |

*Primary Examiner* — Gary Elkins
(74) *Attorney, Agent, or Firm* — Eric Karich; Karich & Associates

(57) ABSTRACT

A packaging 1 comprises a carton tray 3 provided with a flange 17 to which a relatively thick separating ring 15 is sealed. A film 19 is applied to this separating ring and to the inside of the tray. Once the tray 3 has been filled, the open topside of the tray is closed by a cover film 25.

By holding the carton tray 3 and pulling the separating ring 15 from the tray 3 once the contents of the food packaging 1 have been consumed, the plastic film 19 together with the separating ring 15 can be separated from the tray 3 in a simple manner. The thin carton can be pressed together and folded in a simple manner. The thin plastic film and the separating ring hardly take up any space and can be disposed of in the respective waste stream.

3 Claims, 2 Drawing Sheets

(51) Int. Cl.
*B29C 65/50* (2006.01)
*B29C 65/00* (2006.01)
*B65B 7/16* (2006.01)
*B65D 8/00* (2006.01)
*B65D 77/20* (2006.01)
*B29L 31/00* (2006.01)

(52) U.S. Cl.
CPC ....... *B29C 66/7352* (2013.01); *B29L 2031/712* (2013.01)

(56) References Cited

U.S. PATENT DOCUMENTS

| | | | | |
|---|---|---|---|---|
| 5,118,002 A * | 6/1992 | Sugiyama et al. | | 220/270 |
| 5,709,167 A * | 1/1998 | Kelley | | 119/61.5 |
| 5,782,374 A * | 7/1998 | Walker | | 220/23.87 |
| 6,248,380 B1 * | 6/2001 | Kocher et al. | | 426/127 |
| 6,749,063 B2 * | 6/2004 | Parker | | 206/363 |
| 7,939,786 B2 * | 5/2011 | Edwards et al. | | 219/725 |
| 2012/0228306 A1* | 9/2012 | Wallace | | 220/501 |
| 2013/0248411 A1* | 9/2013 | Bader et al. | | 206/557 |

* cited by examiner

FOOD PACKAGING

FIELD OF THE INVENTION

The invention relates to a food packaging comprising an open-topped carton tray which is folded out of a sheet or is shaped by a carton sheet pressed into a mould, which tray comprises a bottom, a side wall and a flange extending along the peripheral edge of the side wall, which packaging further includes a plastic film sealed to the inside of the tray and sealed with its edge to the flange of the tray.

STATE OF THE ART

A packaging of this type is known from WO2009/138786. With this known packaging the film is applied directly to the flange. After the contents of the packaging have been consumed, the film can be removed from the tray after which the carton and the plastic film can be disposed of separately and recycled.

SUMMARY OF THE INVENTION

It is an object of the invention to provide a packaging of the type defined in the opening paragraph with which the plastic film can be separated from the carton tray in a simpler manner. To this end the packaging according to the invention is characterized in that between the film and the flange a flexible plastic separating ring is positioned which is sealed to the flange and to which the edge of the film is sealed. The separating ring is thicker than the film and can hence be pulled away from the tray in a simpler manner. When the separating ring is removed, the film which is applied to the separating ring is also removed from the tray.

An embodiment of the packaging according to the invention is characterized in that the carton tray does not have a stable shape and is retained in a stable shape as a result of the sealed film and/or separating ring. As a result, the tray can be made from a thinner carton sheet than in the absence of a separating ring, so that the packaging may be made of less material.

The invention likewise relates to a method for manufacturing a packaging, comprising the folding or shaping from a carton sheet of a carton tray flanged along the periphery of the open top, and the sealing of a film to the inside and flange of the tray. With respect to the method the invention is characterized in that prior to the film being sealed to the tray first a plastic separating ring is sealed to the flange after which the film is sealed to the inside of the tray and to the separating ring.

BRIEF DESCRIPTION OF THE DRAWINGS

The invention will now be described in more detail based on an example of embodiment of the method and the food packaging according to the invention while reference is made to the appended drawing figures, in which.

DETAILED DESCRIPTION OF THE DRAWINGS

Figure 1:
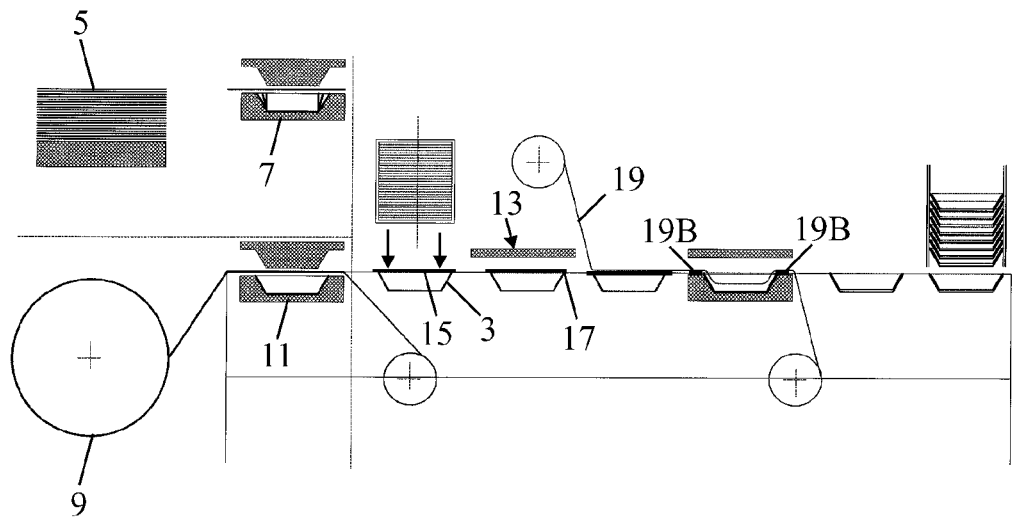
FIG. 1 gives a diagrammatic representation of a production line for manufacturing the packaging according to the invention.

FIG. 1 shows in a diagrammatic manner a production line for manufacturing the packaging according to the invention. The packaging comprises a carton tray 3 which can be manufactured in two different ways. When manufactured in one way, sheets from a stack of already die-cut sheets 5 of perforated carton of about 150 gr/m² are individually positioned in a mould 7. Then the die-cut sheet is shaped in the mould into a folded tray 3. When manufactured in the other way a roll of perforated carton 9 of about 150 gr/m² is unwound. Then in a heated mould 11 a plate is die-cut and pressed into a tray mould.

The carton may be provided with a coating, so that the plastic film sticks better to it. The thickness of the coating is 5% at most of the thickness of the carton.

Subsequently, a plastic separating ring 15 of PE is laid onto the flange 17 of the carton tray 3 and then sealed over the entire periphery to the flange 13.

A flexible plastic film 19 having a thickness of about 70 micrometers and also made of PE is then wound off over the tray 3 and pulled into the tray under vacuum. The film 19 sticks to the carton and is sealed with its edge 19B to the separating ring 15. Then the whole is die-cut from the film 19. The loose trays 3 are stacked and are ready for processing.

Figure 2:
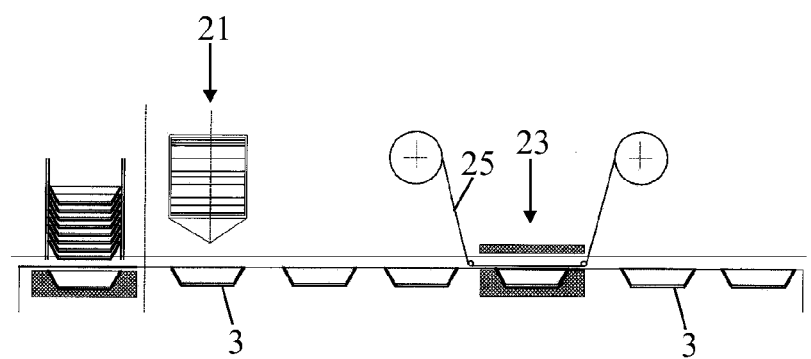
FIG. 2 gives a diagrammatic representation of a packaging line in which the packagings represented in FIG. 1 are used.

FIG. 2 gives a diagrammatic representation of a packaging line in which the packagings manufactured in FIG. 1 are used. The trays 3 are taken from the stack one by one and taken to a filling station 21. Food is put into the tray there after which the tray 3 is transported to a sealing station 23. Here a cover film 25 is stretched out over the open topside of the tray 3 and sealed to the edge of the film already present on the flange of the tray. Subsequently, the tray 3 is cut away from the cover film 25.

Figure 3:
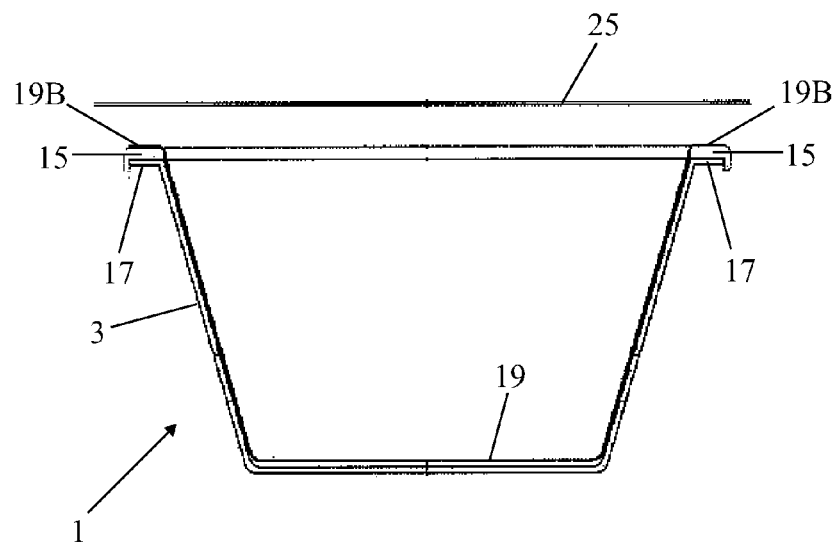
FIG. 3 shows a cross section of a packaging according to the invention.

FIG. 3 shows a cross section of the packaging 1 according to the invention. The separating ring 15 is sealed to the flange 17 of the tray 3. On this separating ring and on the inside of the tray the foil 19 is present. Once the tray 3 has been filled, the open topside of the tray 3 is sealed by a cover film 25.

Figures 4, 5:
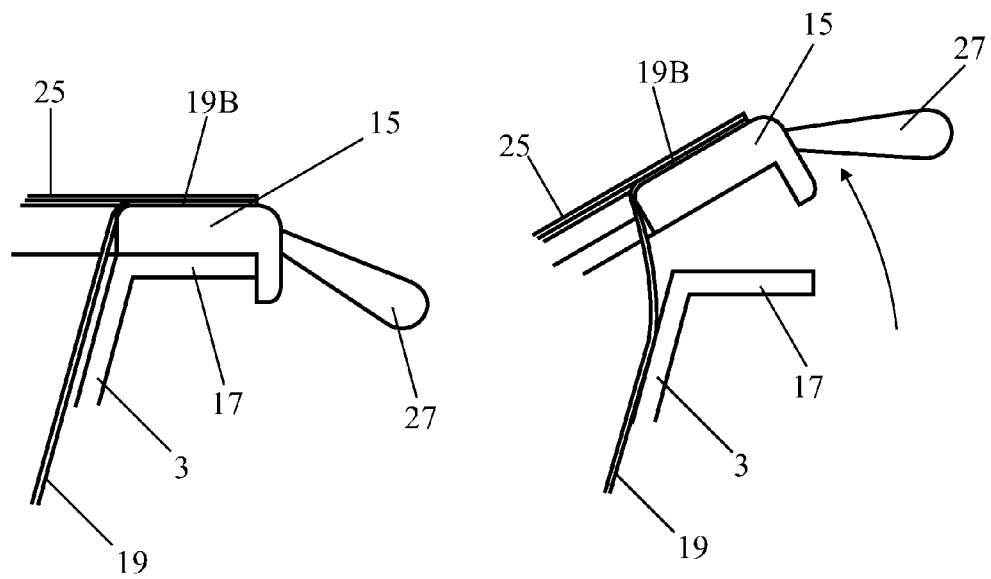
FIG. 4 shows a detail of the flange of the packaging in the place of the lip of the separating ring.
FIG. 5 shows the detail shown in FIG. 4 during the pulling away of the separating ring and the film from the tray.

The plastic separating ring 15 is provided with a lip 27 that projects from the flange, see FIG. 4. Once the contents in the packaging 1 have been consumed, the plastic film 19 together with the separating ring 15 can be separated from the carton tray in a simple manner by holding the carton tray 3 and pulling the lip 27 of the separating ring from the tray 3 (see FIG. 5). As a result, the thin carton loses its rigidity and can be pressed together and folded in a simple manner. The thin plastic film and the separating ring hardly take up any space and can be disposed of in the respective waste stream.

Albeit the invention has been described in the foregoing with reference to the drawings, it should be observed that the invention is not by any manner or means restricted to the embodiments shown in the drawings. The invention also extends to all embodiments deviating from the embodiments shown in the drawings within the spirit and scope defined by the claims.

What is claimed is:

1. A food packaging comprising:
   an open-topped carton tray which is folded out of a sheet or is shaped by a carton sheet pressed into a mould, which tray comprises a bottom, a side wall and a flange extending along the peripheral edge of the side wall, which packaging further includes a plastic film sealed to the inside of the tray and having an edge that is sealed to the inside of the flange of the tray, and further comprising a flexible plastic separating ring that is positioned between the film and the flange such that the flexible plastic separating ring is sealed to the flange and on which the edge of the film is sealed.

2. A packaging as claimed in claim 1, wherein the carton tray does not have a stable shape and is retained in a stable shape as a result of the sealed film and/or separating ring.

3. A method for manufacturing a packaging, comprising the folding or shaping from a carton sheet of a carton tray flanged along the periphery of the open top, and the sealing of a film to the inside and flange of the tray, characterized in that prior to the film being sealed to the tray first a plastic separating ring is sealed to the flange after which the film is sealed to the inside of the tray and to the separating ring.

\* \* \* \* \*